United States Patent [19]

Soikkeli

[11] Patent Number: 5,155,889
[45] Date of Patent: Oct. 20, 1992

[54] APPARATUS FOR THE FORMATION OF AN INSULATING MATERIAL PLY

[75] Inventor: Osmo Soikkeli, Lappeenranta, Finland

[73] Assignee: Oy Partek Ab, Parainen, Finland

[21] Appl. No.: 555,429

[22] PCT Filed: Jan. 23, 1989

[86] PCT No.: PCT/FI89/00011

§ 371 Date: Sep. 11, 1990

§ 102(e) Date: Sep. 11, 1990

[87] PCT Pub. No.: WO89/07731

PCT Pub. Date: Aug. 24, 1989

[30] Foreign Application Priority Data

Feb. 12, 1988 [FI] Finland ............................ 880665

[51] Int. Cl.[5] ............................................. B23Q 5/00
[52] U.S. Cl. ...................................... 29/33 R; 83/176; 83/703
[58] Field of Search ............ 29/33 R, 564, 418, 564.6, 29/564.7, 33 P; 83/176, 177, 156, 161, 703, 706, 707, 808; 156/250, 459, 543

[56] References Cited

U.S. PATENT DOCUMENTS

| 3,808,771 | 5/1974 | Drella et al. .................... 53/521 X |
| 4,266,112 | 5/1981 | Niedermeyer ..................... 83/177 X |
| 4,700,447 | 10/1987 | Spann ................................ 29/418 |
| 4,838,968 | 6/1989 | Nelson .......................... 83/176 X |

FOREIGN PATENT DOCUMENTS

| 139076 | 10/1973 | Netherlands ..................... 29/33 R |
| 921132 | 3/1963 | United Kingdom ............... 29/33 R |
| 1214330 | 12/1970 | United Kingdom ............... 29/33 R |

Primary Examiner—William Briggs
Attorney, Agent, or Firm—Scully, Scott, Murphy & Presser

[57] ABSTRACT

The invention relates to an apparatus for the formation of an insulating material ply, e.g. in the manufacture of insulating chutes. The object is to provide a continuous insulating material ply (17) of a predetermined thickness. A primary ply (14) of surplus thickness is first sawn out of an insulating material roll (1) by rotating the insulating wool roll against the edge of a band saw, and this primary ply (14) is fed to another ply-cutting saw (16) which saws the primary ply into the final ply (17) with the predetermined thickness. The surplus from the primary ply (14) is collected on a drum (19) provided in connection with the ply-cutting saw (16) to form an intermediate storage. When the insulating material (roll) run out, the sawing of the final ply (17) is continued from the intermediate storage without interruption until the leading edge of a new opened insulating material roll (1) reaches the ply-cutting saw (16).

4 Claims, 2 Drawing Sheets

APPARATUS FOR THE FORMATION OF AN INSULATING MATERIAL PLY

In the manufacture of insulating chutes, for instance, a ply with a desired thickness has generally been sawn out of insulation wool wound into a roll, and the ply has then been fed into a machine in which it has been shaped and cured into an insulating chute. The sawing may be carried out by rotating the wool roll against the edge of a band saw.

A drawback has been that the process is interrupted when one roll of wool runs out and is replaced with another. In addition to disturbances caused by the interruption as such, disturbances occur also for the reason that the end portions of an old and a new roll will not get the same evenness as the rest of the ply in the sawing. The result from all this is that quite a great number of insulating chutes of inferior quality are formed due to the interruption.

It is also known to open a roll of wool manually and feed a wool layer of a relatively high thickness into a band saw, the surplus being collected onto an intermediate storage roll from which the sawing is continued when the roll of wool opened manually runs out. A new roll of wool is opened and fed into the band saw after the intermediate storage roll has suitably decreased. In this way a continuous insulating material ply can be obtained; the technique, however, is laborious and requires great watchfulness from the worker.

The object is now to provide a new apparatus for the formation of a continuous insulating material ply in a simple way and automatically.

The object is achieved by means of an apparatus defined in claim 1. Preferred embodiments are defined in more detail in claims 2 to 7.

In the following the invention will be described with reference to the attached schematical drawing.

Figure 1:
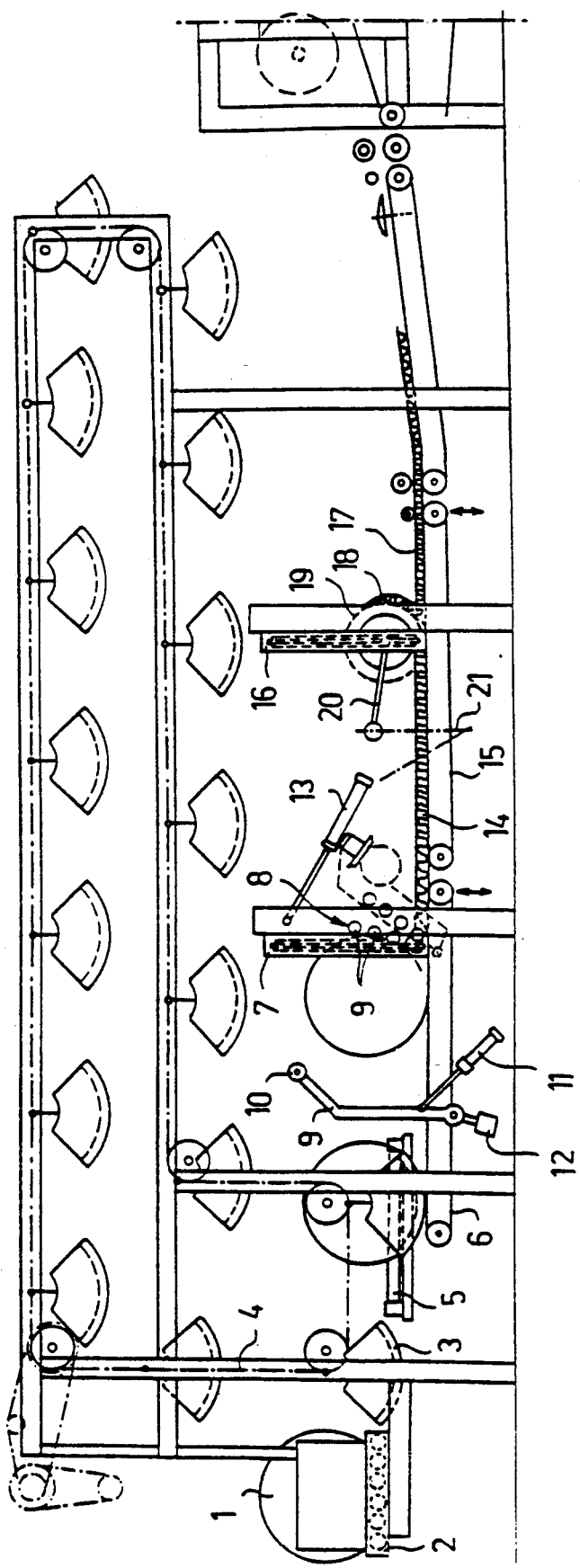
FIG. 1 is a side view of the whole apparatus.
Figure 2:
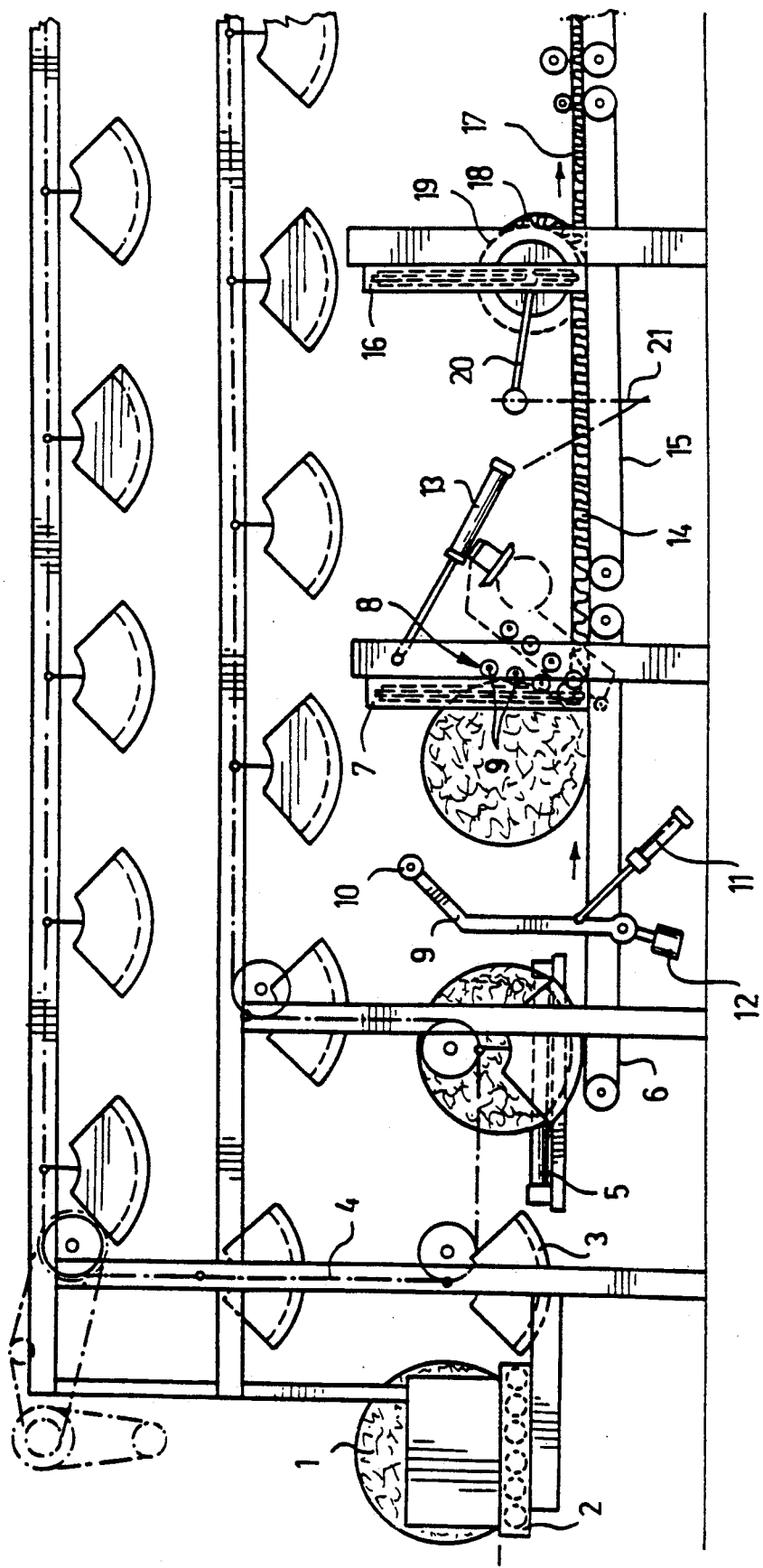
FIG. 2 is an enlarged view of the most important parts of the apparatus.

A roll 1 of insulating wool is positioned on a transporter 2 which transports one roll at a time into a cradle 3 moving with an endless transporter 4. The transporter 4 may be a chain conveyor comprising a number of cradles.

When the cradle 3 with the roll reaches a working cylinder 5, the cylinder tilts the cradle, in the drawing clockwise, so that the roll 1 rolls on to a transporter 6, being stopped by a roller assembly 8 which is provided at a band saw 7 and in which individual rollers 9 rotate actively.

Thereafter a working cylinder 11 is caused to retract from the position shown in the drawing, whereby an arm 9 is lowered towards the roll 1 under the influence of its own weight, being pressed against the roll through a roller 10 which, similarly to the rollers 9, rotates actively. The compression pressure of the roller 10 can be adjusted by means of a counter weight 12. The roller assembly 8 is positioned in the left-hand side position shown in the drawing.

The roll 1 is rotated for some time by means of the roller assembly 8 and the roller 10 until the roll 1 is sufficiently round to be sawn by means of the band saw 7. On coming to the transporter 6, the roll 1 may therefore be rather "deformed"; no core is needed.

When the roll 1 is sufficiently round, the roller assembly 8 is passed into the right-hand side position shown in the drawing by means of a working cylinder 13, whereby the roller 10 presses the roll 1 within the reach of the edge of the band saw, and while the roller assembly 8 and the roller 10 keep rotating the roll, in the drawing anticlockwise, the band saw 7 saws a primary ply 14 out of the roll 1. The primary ply is passed from the transporter 6 on to a transporter 15 and further therealong to another band saw 16 which splits the primary ply 14 into a secondary ply 17 which goes on into a chute manufacturing means to be wound and cured therein. A surplus 18 from the primary ply is collected in a manner known per se e.g. onto a drum 19 formed by a round section, and after the end portion of the primary ply has passed through the band saw 16, the sawing of the secondary ply 17 is continued directly from the intermediate storage.

By means of articulated arms 20, 21, the intermediate storage drum 19 can be displaced away from the band saw for cleaning.

I claim:

1. An apparatus for the formation of a final insulating material ply having a predetermined thickness out of a rotatable roll of insulating material, comprising
    a presawing station for sawing a primary ply out of said roll of insulating material, said primary ply being of a thickness which is at least twice the thickness of said final ply so as to form a surplus thickness of said material, and
    a second station for receiving said primary ply and including a ply-cutting saw for sawing said final ply from the primary ply, and a drum having a circumferential surface for collecting thereon the surplus thickness of material cut from the primary ply by the ply-cutting saw to form an intermediate storage to enable the surplus material on the drum to be fed back into the ply-cutting saw for producing an essentially continuous formation of said final ply having said predetermined insulating material thickness, and wherein the presawing station comprises means for rounding the insulating material roll by rotating before presawing.

2. An apparatus according to claim 1, wherein said means for rounding the roll comprise a transporter, a press roll acting on the roll above the mid plane thereof, and a stopping roller assembly which is arranged to keep the roll out of contact with the presaw during the rounding step and to yield after the rounding has been completed so that the roll is passed to the presawing station.

3. An apparatus according to claim 2, wherein the press roller and individual rollers in the stopping roller assembly are arranged to rotate actively.

4. An apparatus according to claim 2, wherein the presaw is a band saw.

* * * * *